United States Patent [19]
Kechely

[11] 4,126,197
[45] Nov. 21, 1978

[54] WEIGHING RAMP ADAPTOR

[76] Inventor: Raymond O. Kechely, 2635 Tamalpais Dr., Pinole, Calif. 94564

[21] Appl. No.: 833,853

[22] Filed: Sep. 16, 1977

[51] Int. Cl.² ............................................. G01G 19/00
[52] U.S. Cl. .................................................. 177/145
[58] Field of Search ......................... 177/145; 14/71.1

[56] References Cited
U.S. PATENT DOCUMENTS 3,630,299  12/1971  Albagli .................................. 177/145

*Primary Examiner*—George H. Miller, Jr.
*Attorney, Agent, or Firm*—Townsend and Townsend

[57] ABSTRACT

An adaptor includes a frame having tab elements arranged to releasably fit the adaptor to a support platform of a weighing scale. The frame of the adaptor is formed and configured to have removably mounted thereto a wheelchair weighing ramp to thereby allow the weighing ramp to be attached to and used with the weighing scale.

10 Claims, 6 Drawing Figures

U.S. Patent  Nov. 21, 1978  4,126,197
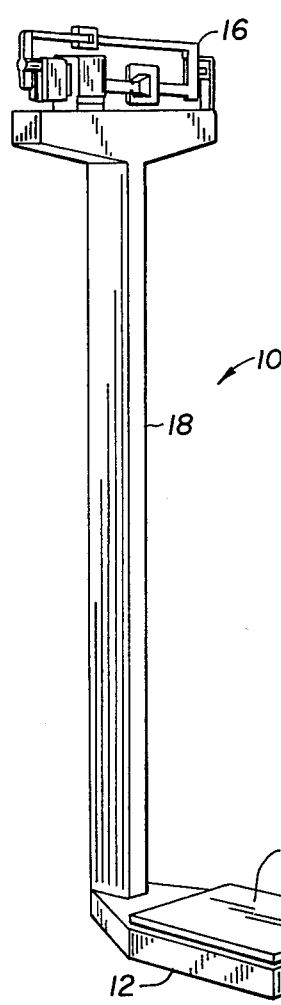
FIG._1.
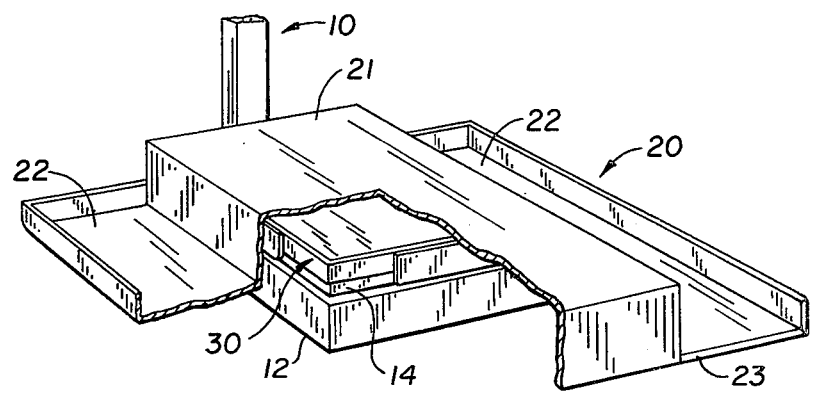
FIG._3.
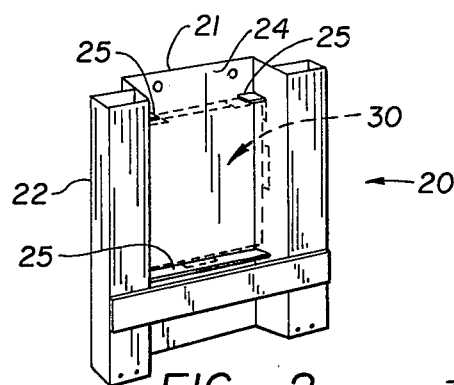
FIG._2.
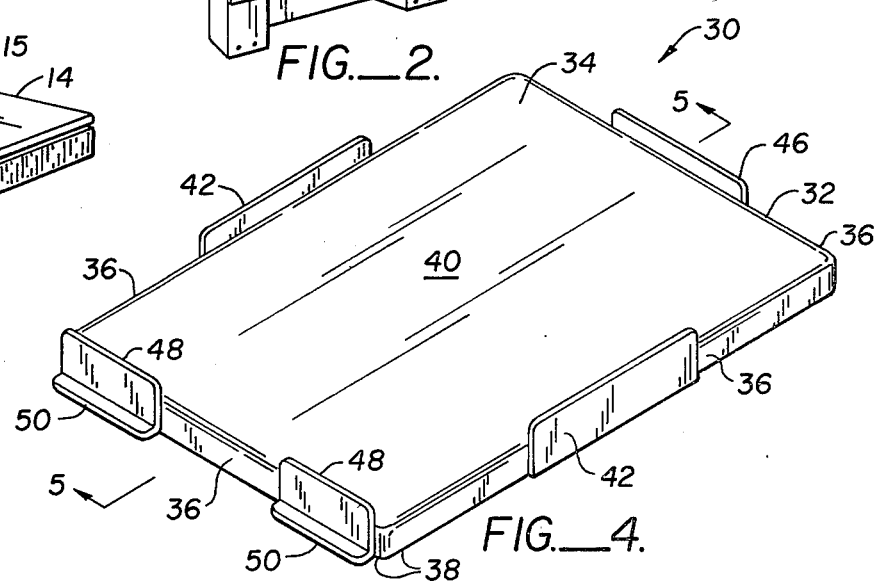
FIG._4.
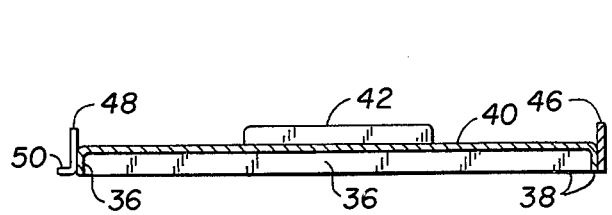
FIG._5.
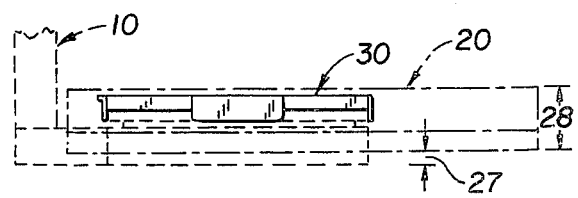
FIG._6.

WEIGHING RAMP ADAPTOR

BACKGROUND AND SUMMARY OF THE INVENTION

There is presently available on the market today a wheelchair weighing ramp structure that allows persons confined to a wheelchair to be weighed without being removed from the wheelchair. Typically, such weighing ramp structure includes a central rectangular body portion with attachment apparatus connected and configured for attaching the ramp to the weighing or support platform of a weighing scale, such as the conventional balance-beam type of weighing scales (sometimes also referred to as a "physicians' scale"). Attached to the longitudinal sides of the body portion are wheel-receiving tracks, which open at one end to receive or dispatch the wheels of a wheelchair into and from the tracks.

In use, the ramp structure is mounted upon the support platform of a weighing scale. Patients confined to a wheelchair are then rolled up to and into the ramp structure, which tips forward to present a sloping surface for rolling the wheelchair. The wheelchair is rolled up this sloping surface and weighing scale support platform to which the ramp is attached. Patient, chair and ramp are weighed with the patient's weight subsequently determined. Unsteady ambulatory patients can be weighed sitting in a chair appropriately positioned on the ramp. Ramp structures, such as are described, can presently be found in many hospitals and physicians' offices. One example of a weighing ramp can be found in U.S. Pat. No. 3,630,299 for PLATFORM WEIGHING SCALE AND LOADING ADAPTER THEREFORE.

However convenient and useful these weighing ramp structures are, they are not without certain disadvantages, most of which arise from the fact that weighing scales are fabricated by different manufacturers. There are no standards set with regard to the dimensions of the weighing scale, nor has there been any real necessity for standardization before now. Thus, dimensions such as the size of the support platform and the height of the top surface of the platform from the ground can differ from manufacturer to manufacturer; dimensions that are important insofar as attachment and function of the ramp structure are concerned.

For example, weighing scales manufactured and sold by Detecto Scales, Inc., under the trademark, DETECTO, typically having weighing platform dimensions of approximately 10⅝ inches wide by 14½ inches long, with the height from floor to top of the platform being approximately 4 inches. In contrast, weighing scales manufactured by Continental Scale Corporation and sold under the trademark HEALTH-O-METER, have platform dimensions of approximately 10¼ inches wide by 13¾ inches long with the height of the top of the platform to the floor being approximately 3¼ inches. Therefore, unless appropriately modified, a weighing ramp structure manufactured for a DETECTO scale would be virtually unusable with a HEALTH-O-METER scale because, at the very least, (1) attachment apparatus of the ramp structure would be too loose for the HEALTH-O-METER scale and (2) the ramp structure itself would be situated too close to the floor, resulting in improper tipping action of the ramp and/or improper weighing action.

Additionally, certain scales may have support platforms that are not rectangular, such as a circular or octagonal shape. Again, the use of a weighing ramp structure specifically designed for the particular weighing scale would be required.

Thus, a hospital which uses several different types of weighing scales may be required to purchase an equal number of weighing ramp structures, one for each specific weighing scale. In addition to requiring a number of ramps, an inventory problem is also created; each weighing ramp structure must be accounted for during inventory, either by the purchaser (hospital or physician) or the distributor.

Accordingly, the present invention presents a solution to these problems in the form of an adaptor that is configured to be removably attached to the support platform of a weighing scale, the adaptor being fabricated for the particular weighing scale to which it is to be attached. The adaptor has sufficient framework, and substitutes this framework for that normally presented by the support platform of the weighing scale, so that a wheelchair weighing ramp can be attached thereto, thereby allowing use of the ramp with a weighing scale that it was not meant for and normally would not function with.

The invention includes a frame defined by a planar body member that has a continuous sidewall attached to and integral with the outer periphery of the body. The sidewall extends in a direction substantially perpendicular to the body member to terminate in an edge that lies in a plane generally parallel to the body member. Tab elements are affixed to the frame and arranged to allow the adaptor to be removably connected to a specific weighing scale support platform.

The frame configuration itself allows attachment of the weighing ramp structure to the adaptor and, in turn, the ramp to a support platform it normally would not attach to. The tab elements and frame configuration allow the ramp to function as intended, without being impeded by any mismatch between the ramp and support platform.

It is presently contemplated that a weighing ramp structure will be manufactured for one specific type of weighing scale — a DETECTO brand weighing scale for example. Adaptors embodying the teachings of the present invention will be fabricated for all other weighing scales the ramp structure would be unsuitable with, each adaptor being manufactured for a specific weighing scale. Each adaptor would thereby allow the use of a single, standardized ramp structure with a variety of weighing scales.

The present invention achieves a number of advantages not heretofore available. There is no need for a number of different types of weighing ramp structures, each type being adapted for use with only one type of weighing scale. A single, standardized model of ramp structures can be designed and manufactured for use with any weighing scale. Thus, a particular facility having a number of different types of weighing scales need purchase only one or two ramp structures which can be used with any of the weighing scales in conjunction with an adaptor of the present invention.

Problems that accompany having to store a number of the larger and bulkier ramp structures (in comparison with the adaptor of the present invention) are alleviated as is the problem of having to keep track of each ramp structure — to ensure that it remains near the weighing scale it is adapted and designed to be used with.

For a fuller understanding of the nature and advantage of the invention, reference should be had to the ensuing detailed description taken in conjunction with the accompanying drawings.

BRIEF DESCRIPTION OF THE DRAWINGS

FIG. 1 is a perspective view of a weighing scale with which the adaptor of the present invention can be used;

FIG. 2 is a perspective view of a weighing ramp structure illustrating attachment of the adaptor of the present invention, shown in phantom, attached thereto;

FIG. 3 is a perspective and partly sectioned view of the base portion of the weighing scale of FIG. 1, illustrating the mounting of the weighing ramp structure to the support platform of the scale using the adaptor of the present invention;

FIG. 4 is a perspective view of the adaptor of the present invention;

FIG. 5 is a section taken substantially along lines 5—5 of FIG. 4; and

FIG. 6 is a side view of the base portion of the weighing scale illustrating attachment of the ramp structure and the adaptor of the present invention.

DETAILED DESCRIPTION OF THE DRAWINGS

Turning now to the drawings, and particularly FIG. 1, there is illustrated a balance beam-type weighing scale 10. Weighing scale 10 includes a base 12, weighing platform 14, balance beam weighing apparatus 16 and upright column 18, which supports the balance beam structure and encloses the linkage mechanism that connects the balance beam weighing apparatus to the weighing platform. Such weighing scales are well known in the art and the particular weighing scale 10 set forth here is merely for exemplary purposes.

FIG. 2 illustrates a weighing ramp structure, generally designated by reference numeral 20, for use with weighing scales — such as weighing scale 10. The ramp structure 20 includes a central, generally rectangular body portion 21 bordered by trough-like tracks 22 that extend in the longitudinal direction of the body portion (FIGS. 2 and 3). Each track 22 has an opening 23 (FIG. 3) to allow travel of the wheels of a wheelchair to and from each track.

The bottom side 24 of ramp structure 20 is provided with attachment apparatus 25 configured to removably attach the ramp structure to the weighing platform of a particular weighing scale, such as platform 14 of scale 10 (FIG. 1). So attached, the ramp 20 can be pivoted about the frame edge 15 of the weighing platform so that the tracks 22 present a sloping surface, relative to the floor surface upon which the scale 10 sits, up which a wheelchair may travel. A wheelchair is rolled up the ramp 20 and onto the support platform of the weighing scale to which the ramp is attached. As the wheelchair is rolled onto the ramp, along the tracks, a point is reached which will cause the ramp to tip from its sloping position to a horizontal position. The wheelchair is now positioned on the weighing scale for weighing.

Unfortunately, as discussed above, weighing scales are manufactured with weighing platforms of differing peripheral and height (above the floor surface) dimensions. Thus, a ramp structure manufactured for a weighing scale that has a first support platform with one set of dimensions will fit loosely upon a second support platform having smaller dimensions. Such a loose fit can and will impair the operation of the ramp. For example, the ramp can slide forward, when tipped, to a position that impedes its return to a horizontal position. In addition, a ramp manufactured for a weighing scale with a support platform top surface positioned a predetermined height above the floor cannot be used at all on another weighing scale whose support platform top surface is so close to the floor that the ramp winds up resting on the floor rather than the support platform. For these and other reasons, ramp structures must be manufactured to fit the particular weighing scale with which the ramp is to be used.

The present invention presents an alternative approach; specifically, an adaptor that is configured to be removably attached to the support platform of a particular weighing scale and, at the same time, is dimensioned to accept and have mounted thereon a ramp structure that would ordinarily not fit the support platform of the scale to which the adaptor is attached.

Thus, the drawings show one embodiment of the invention. As illustrated in the drawings, an adaptor generally designed by reference numeral 30 includes a generally rectangular, planar frame 32 formed to have a generally flat body member 34 with side walls 36 and 38 attached to and integral with the outer peripheries of the body member. The side walls 36 extend generally perpendicular away from the plane of the body member 34. The side walls 36 extend in both the direction of the long dimension of the body member 34 and along the short dimension thereof to form one continuous wall that terminates in a continuous edge 38 lying in a plane that is substantially parallel to the outer surface 40 of body member 34.

Attached to the long or longitudinal side walls 36 of the frame 32 are opposing, flat tab elements 42, which extend in a direction generally parallel to the side walls 36 to terminate above the planar surface 42 of body member 34. Similarly, the short or transverse side walls 36 are provided with a front tab 46 and rear tabs 48 which are also positioned in opposing relation relative to each other, and which also terminate above the surface 42 of body member 34. As illustrated in the Figures, rear tabs 48 are L-shaped, having short extensions 50 coplanar with the edges 40 of the body member and extending outward therefrom. The function of extensions 50 will be more fully explained below when use of the adaptor 30 is described and illustrated.

Having set forth a description of the structure of the present invention, its use and function may now be described with particular reference to FIGS. 2, 3 and 6. For the sake of the following discussion, it will be assumed that weighing ramp 20 has been manufactured for use with a weighing scale other than weighing scale 10; that is, the attachment apparatus 25 of the ramp (FIG. 2) is configured to fit a platform that is longer and wider than support platform 14 and with a support surface that is higher than support surface 15.

The adaptor 30 is first attached to the ramp structure 30, with continuous edge 38, formed by side walls 36, placed in contiguous relation with the underside of the ramp, as illustrated in FIG. 2 (adaptor 30 being illustrated in phantom). With the adaptor so attached, ramp 30 is now provided with apparatus that is configured to be mounted to support platform 14 in the form of the tab elements 42, 46 and 48.

It is advantageous at this point to pause and consider in detail certain of the dimensional aspects of both the ramp structure 20 and the support platform 14, which must be considered when fabricating an adaptor in accordance with the teachings of the present invention. The adaptor must be configured to fit snugly to both the ramp 20 and support platform 14, yet minimize horizontal movement of the ramp relative to the support platform. Thus, placement of tab elements 42, 46 and 48 is such that the tab elements conform to the outline of platform 14 and allow the adaptor to be snugly attached thereto. Similarly, adaptor 30 is also configured to conform to and be firmly held by the attachment apparatus 25 of ramp structure 20. Thus, the combination of the longitudinal and transverse dimensions of frame 32 and tab extensions 50 provide the configuration necessary for a firm yet removable fit of the adaptor to the ramp structure attachment apparatus.

One final dimension must be considered. If the height of top surface 15 of support platform 14 is lower than that for which ramp 20 was manufactured, adaptor 30 must compensate for this difference. Thus, the thickness of frame 32, that is the dimension presented between planes defined by planar surface 42 and continuous edge 38, must be sufficient to position the ramp an appropriate height above the floor surface when appropriately mounted to weighing scale 10.

It should be apparent that if support platform 14 had different dimensions — smaller, for example — the tab elements 42 and/or 46 and 48 could be affixed directly to and extend from planar surface 42 of the adaptor.

With adaptor 30 now fitted to ramp structure 30 (FIG. 2), the ramp structure-adaptor combination is mounted to support platform 14 of weighing scale 10, as illustrated in FIGS. 3 and 6. The tab elements 42, 46 and 48 of adaptor 30 now substitute for the attachment apparatus 25 of ramp 20. The ramp 20 can now function as intended. In particular, not only are attachments of the adaptor 30 to the ramp 20 and support platform 14 sufficient to minimize horizontal movement of the ramp relative to the platform but, as illustrated in FIG. 6, the adaptor positions the ramp a distance 27 above the surface upon which weighing scale 10 sits.

One more aspect of the present invention must be considered. With ramp 20 appropriately mounted to weighing scale 10, through use of adaptor 30, the ramp is capable of functioning as intended. Thus, for use in weighing a patient in a wheelchair, the ramp is tipped, relative to the support platform to which it is mounted, so that track openings 23 are placed proximate the floor surface. In order to ensure that ramp 20 does not move horizontally (relative to the platform) when so tipped, the rear tabs 48 should be of sufficient length to maintain contact with the platform edge and inhibit any such ramp movement.

When the weighing scale is to be used without the ramp structure, the adaptor 30 and ramp structure 20 are removed from the support platform. The adaptor 30 can then be stored for later use with weighing scale 10 (or a weighing scale with the same pertinent dimensions) while the ramp structure 20 can be used with another weighing scale — with or without another adaptor, as the case may be.

While there has been shown and described the particular fundamental novel features of the invention as applied to a specific embodiment thereof, it should be understood that various omissions and substitutions and changes in the form and details of the invention illustrated and its operation may be made by those skilled in the art without departing from the spirit of the invention. It is the intention, therefore, that the instant invention be limited only as indicated by the scope of the claims appended hereto.

I claim:
1. An adaptor for mounting a wheelchair weighing ramp structure upon a support platform of a weighing scale, the adaptor comprising:
   a body member having a broad, planar surface and side walls connected to the outer periphery of the planar surface, the side walls extending generally perpendicular therefrom and terminating in edges that lie in a plane parallel to the planar surface;
   a plurality of tab elements attached to the body member, the tab elements being arranged, relative to the body member, to form a recess into which fits the support platform of the weighing scale; and
   means connected to the body member for mounting the ramp structure thereto, for positioning the ramp structure relative to the support platform, and for preventing horizontal movement of the ramp structure relative to the body member.

2. The adaptor of claim 1, wherein the sidewalls are integral with the body member.

3. The adaptor of claim 1, wherein the adaptor is fabricated from an aluminum material.

4. The adaptor of claim 1, wherein the mounting means releasably attaches the adaptor to the ramp structure.

5. The adaptor of claim 4, wherein the tab elements are arranged to releasably fit the body member to the support platform.

6. In a ramp structure adapted for use with a weighing scale having a support platform having a first predetermined configuration and dimensions, the ramp structure including attachment means configured for removably attaching the ramp structure to a second support platform having a second predetermined configuration and dimensions, an adaptor for releasably mounting the ramp structure to the second support platform, comprising:
   a frame member having first and second parallel, opposed surfaces that are spaced a predetermined distance apart, the first surface being adapted to be mounted in confronting relation to the first support platform, the second surface being adapted to support the ramp structure thereon, the frame being formed and configured to have the ramp structure attached thereto and to prevent movement of the ramp structure relative to the frame when attached thereto;
   first means attached to the frame for preventing horizontal movement of the frame relative to the support platform;
   second means attached to the frame for preventing horizontal movement of the ramp structure; and
   whereby the adaptor allows the ramp structure to be removably mounted upon the first support platform of the first weighing scale so that horizontal movement of the platform relative to the weighing scale is prevented.

7. The adaptor of claim 6, wherein the preventing means allows the ramp structure to be pivoted about an edge of the support platform with a minimum of horizontal movement of the ramp structure relative to the support platform.

8. The adaptor of claim 6, wherein the frame is fabricated from aluminum.

9. The adaptor of claim 6, wherein the frame is formed and configured to allow removable attachment of the ramp structure thereto.

10. The adaptor of claim 9, wherein the frame is substantially rectangular in shape.

* * * * *